(12) United States Patent
Burns et al.

(10) Patent No.: US 7,793,230 B2
(45) Date of Patent: Sep. 7, 2010

(54) SEARCH TERM LOCATION GRAPH

(75) Inventors: Eric L. Burns, Seattle, WA (US); Harry Kaplanian, Mercer Island, WA (US); Zoltan C. Szilagyi, Redmond, WA (US); Philip Ti-Fei Su, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 240 days.

(21) Appl. No.: 11/565,224

(22) Filed: Nov. 30, 2006

(65) Prior Publication Data

US 2008/0134033 A1 Jun. 5, 2008

(51) Int. Cl.
G06F 3/048 (2006.01)
G06F 3/00 (2006.01)
G06F 7/00 (2006.01)

(52) U.S. Cl. .................. 715/787; 715/708; 715/786; 715/833; 707/728; 707/722; 707/729; 707/730

(58) Field of Classification Search .............. 715/708, 715/712, 786, 787, 833; 707/3, 728, 729, 707/722, 730
See application file for complete search history.

(56) References Cited

U.S. PATENT DOCUMENTS

| | | | | |
|---|---|---|---|---|
| 5,479,600 | A * | 12/1995 | Wroblewski et al. | 715/787 |
| 6,029,195 | A | 2/2000 | Herz | |
| 6,249,785 | B1 | 6/2001 | Paepke | |
| 6,631,496 | B1 | 10/2003 | Li et al. | |
| 6,882,354 | B1 * | 4/2005 | Nielsen | 715/784 |
| 6,968,332 | B1 | 11/2005 | Milic-Frayling et al. | |
| 7,039,631 | B1 | 5/2006 | Finger, II | |
| 2003/0065655 | A1 * | 4/2003 | Syeda-Mahmood | 707/3 |
| 2004/0073625 | A1 | 4/2004 | Chatani | |
| 2004/0178623 | A1 | 9/2004 | Dotsenko | |
| 2005/0091274 | A1 * | 4/2005 | Stanford | 707/104.1 |
| 2005/0091604 | A1 * | 4/2005 | Davis | 715/772 |
| 2005/0154761 | A1 | 7/2005 | Lee et al. | |
| 2006/0010126 | A1 | 1/2006 | Anick et al. | |
| 2006/0031195 | A1 | 2/2006 | Patterson | |
| 2006/0031221 | A1 | 2/2006 | Melman | |
| 2006/0085395 | A1 * | 4/2006 | Cradick et al. | 707/3 |
| 2006/0111893 | A1 * | 5/2006 | Florian et al. | 704/8 |
| 2006/0212441 | A1 | 9/2006 | Tang et al. | |
| 2007/0198951 | A1 * | 8/2007 | Frank | 715/838 |
| 2008/0071738 | A1 * | 3/2008 | Hoeber et al. | 707/3 |
| 2008/0077583 | A1 * | 3/2008 | Castro et al. | 707/5 |
| 2008/0097970 | A1 * | 4/2008 | Olstad et al. | 707/3 |

OTHER PUBLICATIONS

International Search Report dated and mailed Jan. 22, 2008 for PCT/US2007/017520, 2 pages.

Chou, et al. "A Randomized Power Management Protocol with Dynamic Listen Interval for Wireless Ad Hoc Networks" Vehicular Technology Conference 2006-Spring IEEE 63rd vol. 3 May 5-10, 2006 pp. 1251-1255.

(Continued)

*Primary Examiner*—Ting Lee
(74) *Attorney, Agent, or Firm*—Shook, Hardy & Bacon LLP

(57) ABSTRACT

The claimed subject matter provides a system and/or a method that facilitates conveying enhanced query results. An interface component can receive a query corresponding to data. A visual component can employ a search result based at least in part upon the query, wherein the search result includes a graphic identifying a location of at least one term of the query within the queried data.

19 Claims, 12 Drawing Sheets

OTHER PUBLICATIONS

Jurca, et al. "Joint synchronization, routing & energy saving in LSMA/CA Multi-hop hybrid network" Mobile Ad-Hoc and Sensor System 2004 IEEE International Conference Oct. 25-27, 2004 pp. 245-254.

Zabien. "Power Management Mechanism for Routing in the Ad-Hoc Wireless Networks" Proceedings of the First Mobile Computing & Wireless Communications International Conference 2006 Sep. 17-20, 2006 pp. 44-49.

Balios. "The Engine for Bayesian Logic Programs" (2005) In PKDD, pp. 549-551.

eBrbary http://www.ebrary.com/corp/techReader.jsp last viewed Sep. 28, 2006, 3 pages.

Anacleto http://www.tesujionline.com/eng/presenting_anacleto_en.pdf last viewed Sep. 28, 2006, 2 pages.

* cited by examiner

SEARCH TERM LOCATION GRAPH

BACKGROUND

In many instances, a search engine is utilized to search for information. In general, a search engine is a special program (e.g., computer executable instructions) designed to help find files (e.g., web pages, images, text . . . ) stored on a computer, for example, a public server or on one's own personal computer. A typical search engine allows a user to invoke a query for files that satisfy particular criteria, for example, files that contain a given word or phrase in a title or body. Web search engines generally work by storing information about a large number of web pages retrieved from the World Wide Web (WWW) through a web crawler, or an automated web browser, which follows essentially every link it locates. The contents of each web page are then analyzed to determine how it should be indexed, for example, words can be extracted from the titles, headings, or special fields called meta-tags. Data about web pages is stored in an index database for use in later queries. Some search engines store (or cache) all or part of a source page as well as information about the web pages. When a user invokes a query through the web search engine by providing key words, the web search engine looks up the index and provides a listing of web pages that best-match the criteria, usually with a short summary containing the document's title and/or parts of the text.

In general, the usefulness of a search engine depends on the relevance of the results it presents to a user and the presentation of such results. While there can be numerous web pages that include a particular word or phrase, some web pages may be more relevant, popular, or authoritative than others. Most search engines employ methods to rank the results to provide a "best" result first. How a search engine decides which pages are the best matches, and what order the results should be shown in, varies widely from one engine to another. Conventionally, the technique for displaying what the search engine considers relevant information about a web page to a user can be based on a static ranking and a dynamic ranking. In other words, query results are traditionally ranked based on the number of links and the traffic associated with such links. Thus, a particular web page can be ranked very high solely because a link within such web page has a relatively high amount of traffic. Specifically, a static ranking can involve seeing how many other web pages link to a web page as well as the density of matches to the search term on the page. Dynamic ranking can involve ranking a page slightly higher every time a user clicks on that link after it appears in search results.

As of late, there is an increase and rapid movement toward gathering and indexing non-web content by search engines to allow access and availability via the Internet. In particular, books are books are increasingly being scanned and indexed by major search portals. A typical problem associated with gathering massive amounts of data is the ability of a user to ascertain which of the books presented in search results are relevant and applicable to a query. Conventional search systems can rank and present search results in an algorithmic order that tends to be somewhat useful to the user, yet users need a more efficient manner to make their own relevance filtering of search results based on visual information that they did not have before.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate employing a location graphic that identifies a location for at least one search term. A visual component can generate a search term location graphic based at least in part upon query data received via an interface, wherein the search term location graphic provides the location of a query term within the queried data. The search term location graphic can provide a global context in connection with the queried data on the location of query term(s). In other words, the search term location graphic can illustrate the location and/or locality of particular search terms received in respect to the content and/or data being searched and/or queried. The visual component can employ the search term location graphic in addition to the query results, wherein each query result can include a respective search term location graphic. Moreover, the search term location graphic can be a line graph map that plots the occurrence of search terms within the queried data.

The visual component can utilize an emphasis component that provides various accentuation techniques in order to portray search term(s) within the search term location graphic. The emphasis component can employ a multitude of colors, shapes, vertical lines, horizontal lines, dots, circles, stars, arrows, squares, rectangles, triangles, font, size, bold, italicize, highlight, underline, color variance, strikethrough, any portion of a graphic that can indicate a location on the graph, etc.

The visual component can further utilize a scroll-bar component that can integrate the search term location graphic into at least one of a scroll-bar, a slider, and/or a tool utilized for data navigation. The integrated search term location graphic can be utilized in a horizontal orientation and/or a vertical orientation for a specific portion of queried data. In addition, the slider, tool, and/or scroll thumb can be at least partially transparent so as to not interfere with illustrating search term location within the queried data.

The visual component can utilize a navigation component that allows navigation to a particular portion of the queried data based upon the selection of such correlating position on the search term location graphic. In addition, the visual component can utilize a hover component that can display a portion of the queried data upon a cursor and/or mouse hovering over a position (e.g., corresponding to the portion displayed) on the search term location graphic. In other aspects of the claimed subject matter, methods are provided that facilitates providing enhanced query results employing a map graphic to illustrate query term(s) locality.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
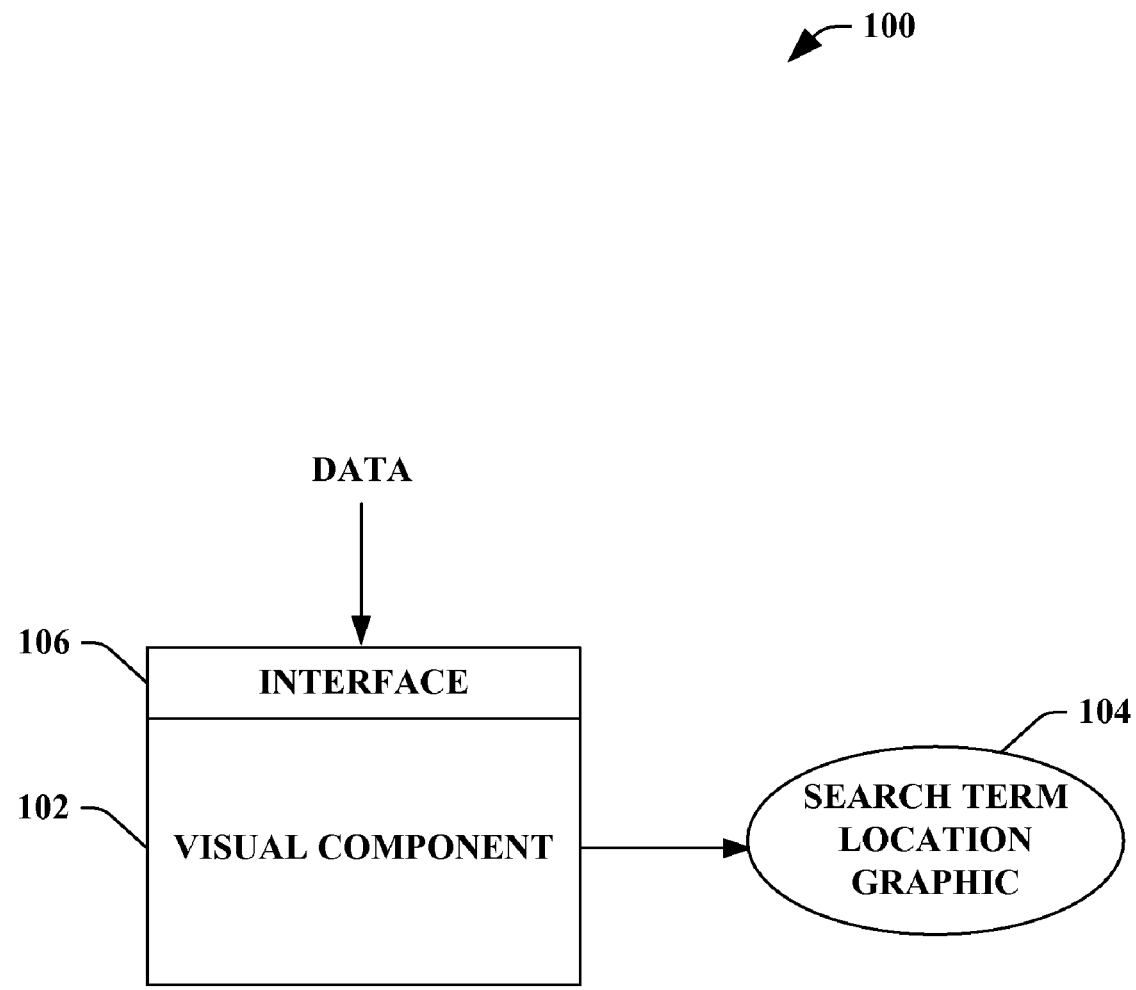
FIG. 1 illustrates a block diagram of an exemplary system that facilitates conveying query results related to data and respective content.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates conveying query results related to data and respective content. The system 100 can include a visual component 102 that can employ a search term location graphic 104 identifying the location of at least one query term within searched content and/or data. Specifically, the visual component 102 can receive data (e.g., query term, query data, search data, search term, query term, search string, a character, a phrase, etc.), wherein the visual component 102 can provide a search term location graphic 104 (e.g., a map graphic, a graphic including search term positioning within the searched data/content, a line graph graphic, etc.). The search term location graphic 104 can illustrate the location and/or locality of particular search terms received (via the interface 106) in respect to the content and/or data being searched and/or queried (e.g., which may be many books and/or a single book). It is to be appreciated that the data queried and/or searched can be any suitable data related to an electronic book, a book, an electronic book file, an electronic magazine, a magazine, an electronic magazine file, an electronic periodical, an electronic periodical file, a periodical, a one-dimensional electronic document (e.g., which expresses the category of units of information that can be usefully linearly ordered), a one-dimensional file, an electronic document, a web page, a web site, an email, an audio file, a video file, data with a slider for navigation, data with a scroll-bar for navigation, an electronic file, a word-processing document, a text document, an audio clip, a video clip, and an instant messenger message, etc.

In one example, a data query can be related to a collection of books that have been scanned and uploaded to a particular database for access. The data query can be, for instance, "Cleveland travel," wherein such query should provide results that relate to any data (e.g., books, magazines, periodicals, one-dimensional electronic documents, etc.) that correspond to travel and the city of Cleveland. Conventionally, the search system and/or respective algorithm would sort such results (e.g., books, magazines, periodicals, one-dimensional electronic documents, etc.) based at least in part upon relevancy. However, the system 100 allows a search term location graphic 104 to be employed in connection with each individual search result such that a search term location graphic 104 illustrates the location of the terms "Cleveland" and "travel" within each individual data/content searched (e.g., in this example for each book). In other words, the query would produce results, wherein each result can include a respective search term location graphic 104. Thus, a search can provide relevant results based on the data query and, in addition, provide a map with an insight on the location of each term within that particular content/data.

In another example, the search term location graphic 104 can be associated with audio and/or video to identify a location of particular search term(s) within individual content/data. The data query can relate to audio data and/or video data, wherein such data can be transcribed to allow for identification of locations for the specific search term(s). The query results can be provided and each result can include the search term location graphic 104 illustrating the location of term(s) from the beginning of the data to the end of the data. In other words, the audio clip search result can include a map (e.g., search term location graphic 104) that depicts when certain terms are utilized therein (e.g., at 2:01 into the clip, at 5:23 into the clip, and so on and so forth).

In still another example, the visual component 102 can overlay and/or integrate the search term location graphic 104 on a slider and/or a scroll bar associated with data. Thus, a one-dimensional file (e.g., an electronic document, a word-processing document, a magazine file, a periodical, a web page, an audio clip, a video clip, an email, an instant messenger message, and the like) can be queried to produce results that can be mapped and/or annotated to a scroll-bar and/or slider. In other words, the slider and/or scroll-bar associated with data can employ a search term location graphic 104 that depicts the location of search terms utilized for a query. In an email, a user can search for a specific term. Typically, the search technique utilized identifies the term searched in the file without any context related to the location within the entire searched file/data/content. By overlaying the search term location graphic 104 on a slider and/or scroll-bar associated with the searched data/content, context is provided to give an idea of the location and/or locality of search term(s) in respect to the entire data/content searched.

In addition, the system 100 can include any suitable and/or necessary interface component 106 (herein referred to as "interface 106"), which provides various adapters, connectors, channels, communication paths, etc. to integrate the visual component 102 into virtually any operating and/or database system(s) and/or with one another. In addition, the interface component 106 can provide various adapters, connectors, channels, communication paths, etc., that provide for interaction with the visual component 102, search term location graphic 104, and/or any other component, data and the like associated with the system 100.

Figure 2:
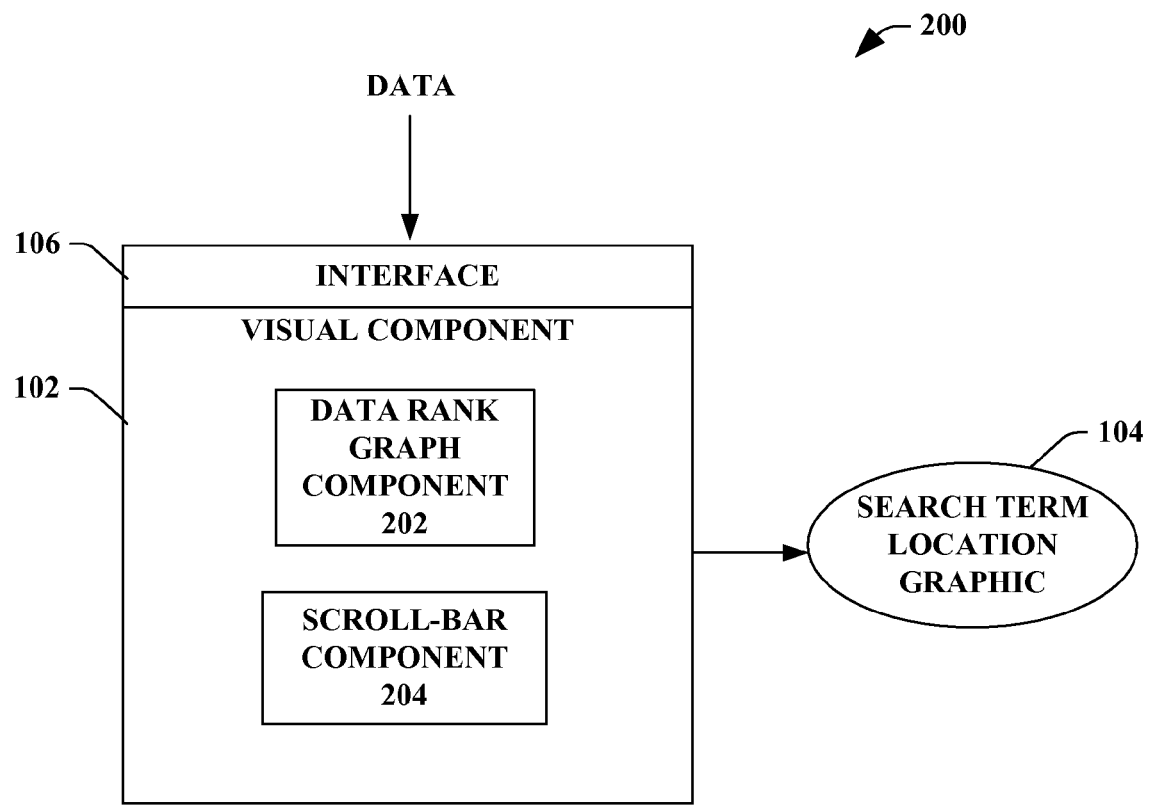
FIG. 2 illustrates a block diagram of an exemplary system that facilitates employing a location graphic that identifies a location for at least one search term.

FIG. 2 illustrates a system 200 that facilitates employing a location graphic that identifies a location for at least one search term. The system 200 can include the visual component 102 that can generate and employ the search term location graphic 104 that can identify locations related to query data within specific data/content. In particular, the search term location graphic 104 can be a portion of a graphical map that illustrates term placement within the searched/queried data/content for each term utilized in the query/search. It is to be appreciated that the data searched can be, but is not limited to being, books, text documents, magazines, periodicals, one-dimensional electronic documents, electronic documents, web pages, web sites, email, audio, video, any suitable data with a slider for navigation, any suitable data with a scroll-bar for navigation, electronic files, word-processing documents, magazine files, audio clips, video clips, instant messenger messages, etc.

The visual component 102 can further include a data rank graph component 202 that can generate the search term location graphic 104 for search results to identify term location in each result. The data rank graph component 202 can receive a data query via the interface 106, wherein the data rank graph component 202 can employ a graph that depicts the positioning of the searched terms within each result the query provides. The data rank graph component 202 can utilize the search term location graphic 104 with various colors, fonts, details, graphics, and the like such that the search term location graphic 104 gives an indication on the whereabouts of a term within a search result (e.g., queried data, content, query target, etc.).

Judging the importance of a search results related to data/content can be difficult due to the size (e.g., number of pages) and the large distribution of information within the content/data itself. Standard algorithmic techniques are not always accurate when determining the relevance for the user. The technique employed by the system 200 can allow users to visually ascertain the relevance of data/content without reading the entire content/data. The data rank graph component 202 can take the positions of words in the data/content that the user has searched for and plot their positions on a small graph. For instance, a query aimed at ten sources can relate to the term "holiday." The ten results can be listed based on relevance and further include the search term location graphic 104 that conveys the location of the term "holiday" within each of the ten results. Thus, a user can be given more context and/or insight on the relevancy of search results.

The visual component 102 can further include a scroll-bar component 204, wherein the scroll-bar component 204 can employ the search term location graphic 104 to at least one of a slider and/or a scroll-bar associated with the queried content/data. The scroll-bar component 204 can integrate the search term location graphic into at least one of a slider, a scroll-bar, a tool utilized to navigate data, etc. Such integration facilitates providing a global view of data/content, wherein such global view illustrates search term and/or query term positioning within such data/content. The search term location graphic 104 can be a miniature representation of the entire document (e.g., data, content, electronic file, electronic book, one-dimensional data, word processing document, etc.) as either a horizontal or vertical bar, wherein the coloration of the bar is drawn so as to present a spatial position of the annotations with respect to the entire data/content. It is to be appreciated that annotations can encompass search results or one of several other possible types of other items distributed throughout the document/data/content. For instance, the claimed subject matter is to include various types of annotations such as, but not limited to, graphics, pictures, numbers, headers, footers, signatures, digital signatures, watermarks, metadata (e.g., document properties, format, size, etc.), ink annotations, voice annotations, comment bubbles, images, and/or any other suitable data/items distributed throughout a document/data.

The scroll-bar component 204 can combine the annotation map (e.g., the collection and incorporation of the relevant search term location graphics) with a scroll-bar and/or slider feature associated with navigating data/content. The scroll-bar can be one that scrolls in the direction of the data's one-dimensional growth (e.g., data that grows in one direction as you add content such as, but not limited to, web pages, books, magazines, word processing documents, slide-show presentations, etc.) such as a vertical or horizontal scroll-bar or slider. The scroll-bar's central area is normally called the "gutter," wherein the gutter can be rendered to include the annotation map (e.g., the search term graphic 104) in the gutter area. The scroll-bar can continue to perform its scrolling functions and/or features without any required modification in behavior versus what is normal for conventional scroll-bars.

Figure 3:
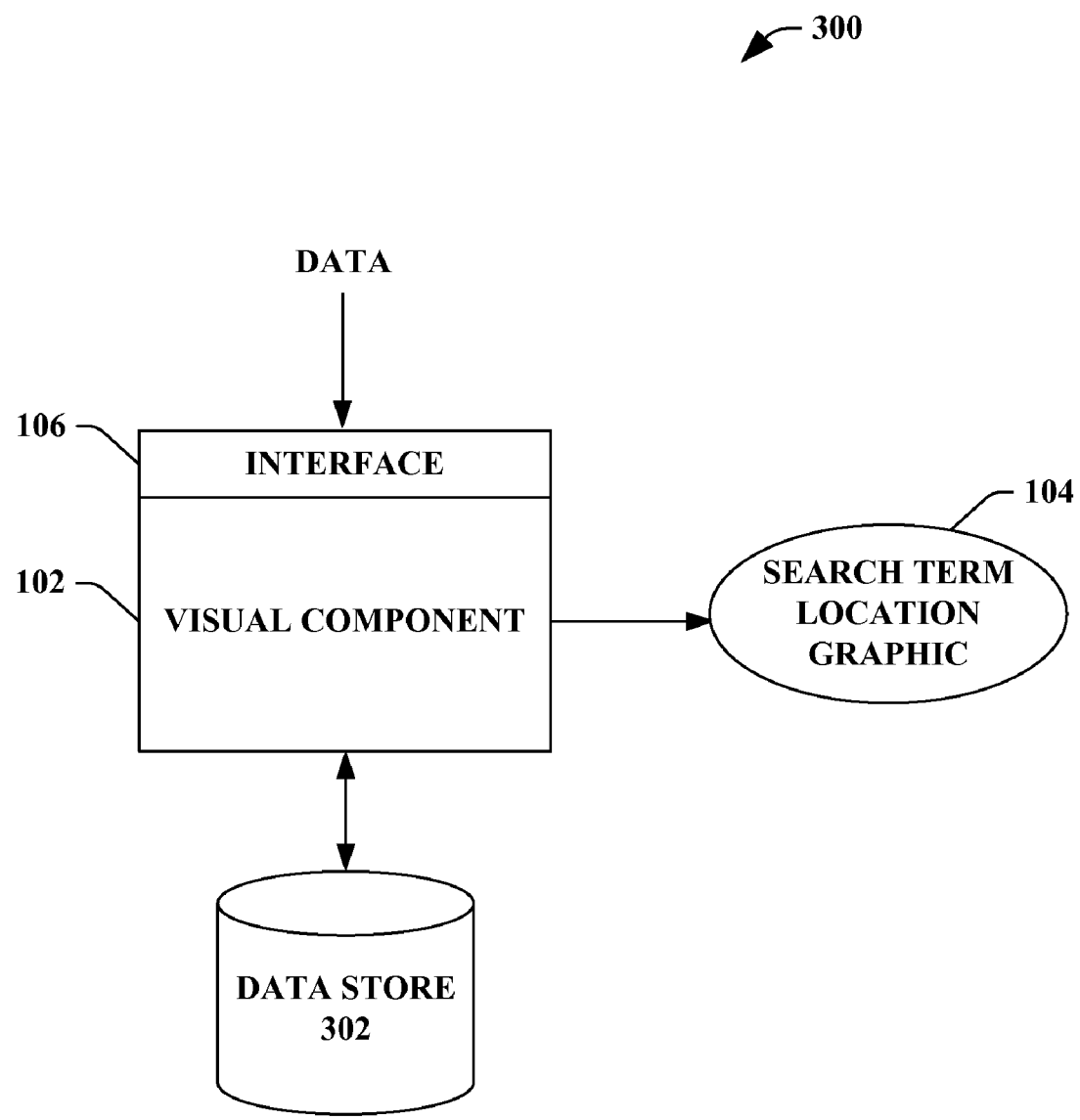
FIG. 3 illustrates a block diagram of an exemplary system that facilitates providing enhanced query results employing a map graphic to illustrate query term(s) locality.

FIG. 3 illustrates a system 300 that facilitates providing enhanced query results employing a map graphic to illustrate query term(s) locality. The visual component 102 can create an annotated map that includes at least a portion of the search term location graphic 104, wherein such map can provide global and spatial context in connection with search terms and positioning therewith. For instance, the visual component 102 can employ the search term location graphic 104 as an additional result upon querying. In another example, the visual component 102 can integrate the search term location graphic 104 into a gutter of a scroll-bar, a slider, and/or any other suitable navigation tool utilized with one-dimensional data.

The system 300 can further include a data store 302 that can include any suitable data related to the visual component 102, and the search term location graphic 104. For instance, the data store can include query data, content, data that is queried, book data, document data, electronic document data, one-dimensional data, magazine data, periodical data, web page data, paperback data, any suitable data that can be searched via a query, etc. It is to be appreciated that the data store 302 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 302 of the subject systems and methods is intended to comprise, without being limited to, these and any other suitable types of memory. In addition, it is to be appreciated that the data store 302 can be a server, a database, a hard drive, and the like.

Figure 4:
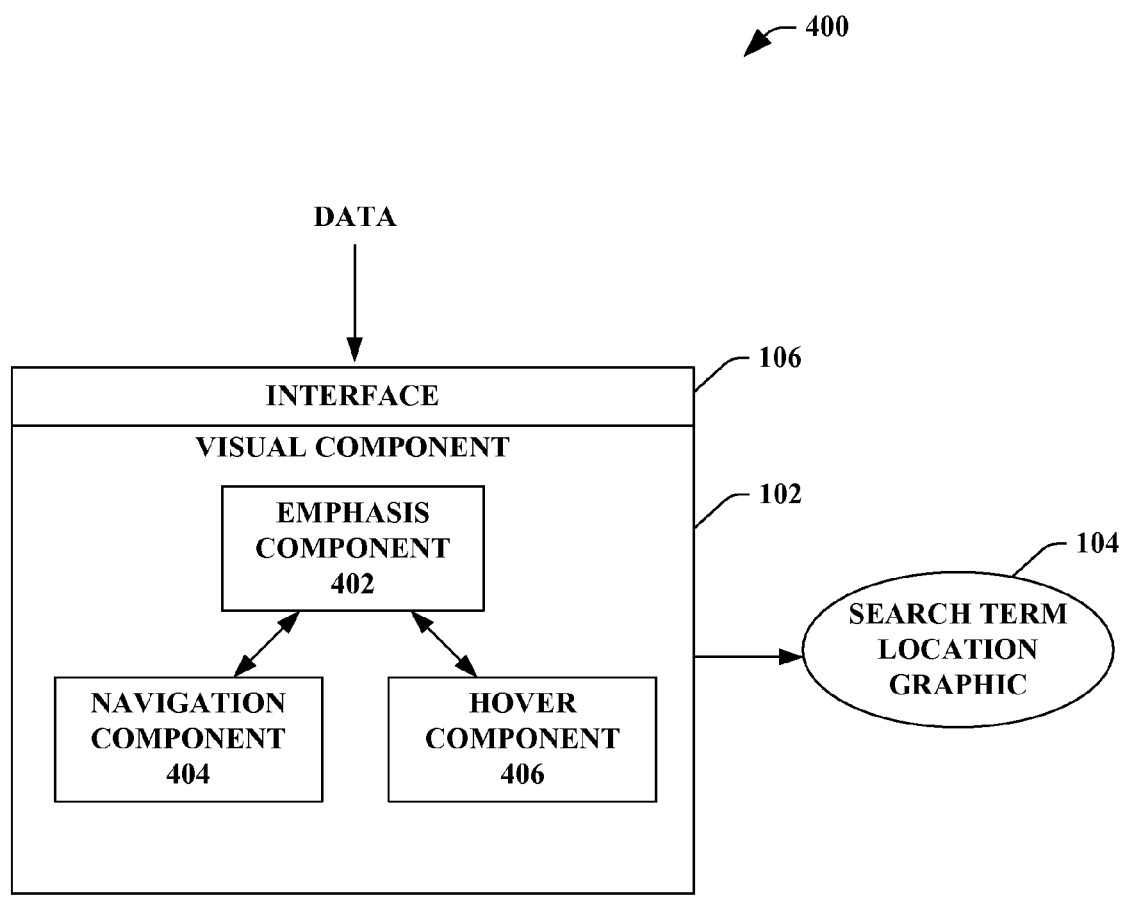
FIG. 4 illustrates a block diagram of an exemplary system that facilitates implementing a graphic to convey a location of a search term within the searched content/data.

FIG. 4 illustrates a system 400 that facilitates implementing a graphic to convey a location of a search term within the searched content/data. The system 400 can include the visual component 102 that can create the search term location graphic 104 which can be associated with query results to provide search result relevancy. The visual component 102 can include an emphasis component 402 that can enhance the search term location graphic 104 to assist in search terms to stand out amongst the vast data/content searched. For example, the emphasis component 402 can vary a characteristic of the search term and/or the search term location graphic 104 such as color, font, size, bold, italicize, highlight, underline, color variance, strikethrough, and the like. Moreover, the emphasis component 402 can utilize accentuations such as vertical lines, horizontal lines, dots, circles, stars, colors, arrows, squares, rectangles, triangles, shapes, any portion of a graphic that can indicate a location on the graph, etc. In particular, the color of a particular term can also be used for the identification of such term on the search term location graphic 104. Moreover, the emphasis component 402 can initiate a color variance and/or intensity aspect, wherein particular colors can correlate to an amount of the search term. For example, the intensity can be substantially similar to a weather precipitation map, wherein a dark color can indicate a location within the data/content that includes a plurality of a term and a light color can indicate a location within the data/content that includes a sparse amount of the term.

The visual component 102 can further utilize a navigation component 404 that can navigate to a location within data/content based at least in part upon a selection of a location within the search term location graphic 104. Thus, a user can query data, receive results, and navigate to a particular section and/or portion within a result based on the corresponding search term location graphic 104. In other words, selecting an area within the search term location graphic 104 can allow the navigation component 404 to display the portion and/or section of data/content associated with that area. For example, a query can produce six results, wherein each result can include the search term location graphic 104 that plots term location from the beginning of the data/content searched to the end. A user can then select an area on the search term location graphic 104 to view such portion of that particular result.

The visual component 102 can further utilize a hover component 406 that allows a portion of the data/content to be displayed upon a cursor and/or mouse hovering over the search term location graphic 104. In particular, the cursor and/or mouse can hover over a specific portion of the search term location graphic 104 that identifies a searched term and a pop-up graphic can illustrate a portion of data related to such location. Thus, the hover component 406 can provide a sneak-preview of the data/content and location(s) of search terms. For instance, the search term location graphic 104 can include eight terms within an individual query result, wherein the data/content searched includes a plurality of pages. The user can, rather than navigating throughout the entire document, hover a mouse pointer, cursor, and the like over an area in the search term location graphic 104 to provide a portion of data/content corresponding to the area within such data/content.

Figure 5:
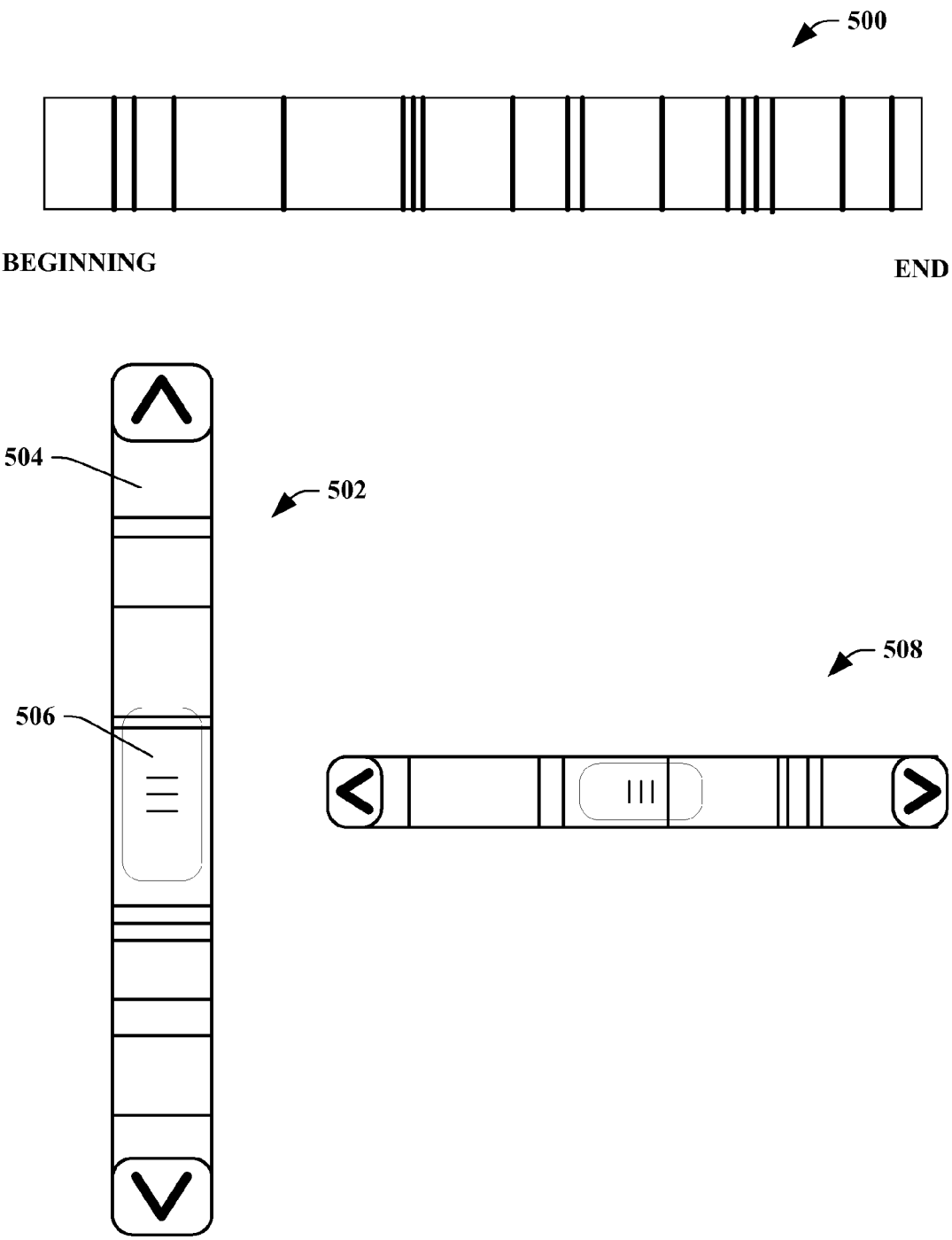
FIG. 5 illustrates a block diagram of exemplary graphics that facilitate illustrating search term locations within a queried document and/or data.

FIG. 5 illustrates various graphics that facilitate illustrating search term locations within a queried document and/or data. A search term location graphic 500 is depicted in FIG. 5. It is to be appreciated that the size, color, and orientation of such search term location graphic 500 is not to be limited to such illustrated example as there are a plurality of colors, sizes, and orientations that can be employed. The search term location graphic 500 can include a map from beginning to end in relation to a particular data/content such as, but not limiting to, books, magazines, periodicals, one-dimensional electronic documents, electronic documents, web pages, web sites, email, audio, video, any suitable data with a slider for navigation, any suitable data with a scroll-bar for navigation, electronic files, word-processing documents, magazine files, audio clips, video clips, instant messenger messages, etc.

The search term location graphic 500 can further include indications of term location such as vertical lines (e.g., as depicted), horizontal lines, dots, circles, stars, colors, arrows, squares, rectangles, triangles, shapes, any portion of a graphic that can indicate a location on the graph, etc. Moreover, it is to be appreciated that the search term location graphic 500 can include such indications in a variety of colors to designate the representation of a particular search term. For example, if the search term was "Cleveland travel," one color can be designated for the term "Cleveland" while a disparate color can be designated for the term "travel." It is to be further appreciated and understood that the number of indications on the search term location graphic 500 can include any suitable number of indications and the depicted example is not to be limiting.

The search term location graphic can be integrated into a scroll-bar as depicted with a scroll-bar with search term location graphic 502. A gutter 504 associated with a scroll-bar and/or slider can include the search term location graphic embedded and/or be an overlay onto the scroll-bar, slider, and the like. As illustrated, the scroll-bar and/or slider can include a scroll thumb 506 within the gutter 504, wherein the scroll thumb 506 can be at least partially transparent to allow viewing and/or display of the indications of search terms and positioning within data/content. Moreover, the scroll-bar with search term location graphic 502 is depicted in a vertical orientation; yet the scroll-bar with search term location graphic can also be utilized in the horizontal position as indicated with a scroll-bar with search term location graphic 508.

The scroll-bar with search term location graphic works well since the position of the visible portion of the data/content to the distribution of annotations in the data/content is simple and directly expressed. Navigation based on clumps of annotations is direct and intuitive. The user does not have to look at two areas of the screen in order to accomplish such navigation and no more screen space is utilized than what would be needed for a conventional scroll-bar, which enables other uses of the remaining screen space (e.g., such as having more of the data/content visible, having a larger default zoom level, enabling easier reading, etc.). Moreover, the technique may not change the scrolling behavior of the scroll-bar, so it is easy for the user familiar with traditional scrollbars to learn to use it.

Figure 6:
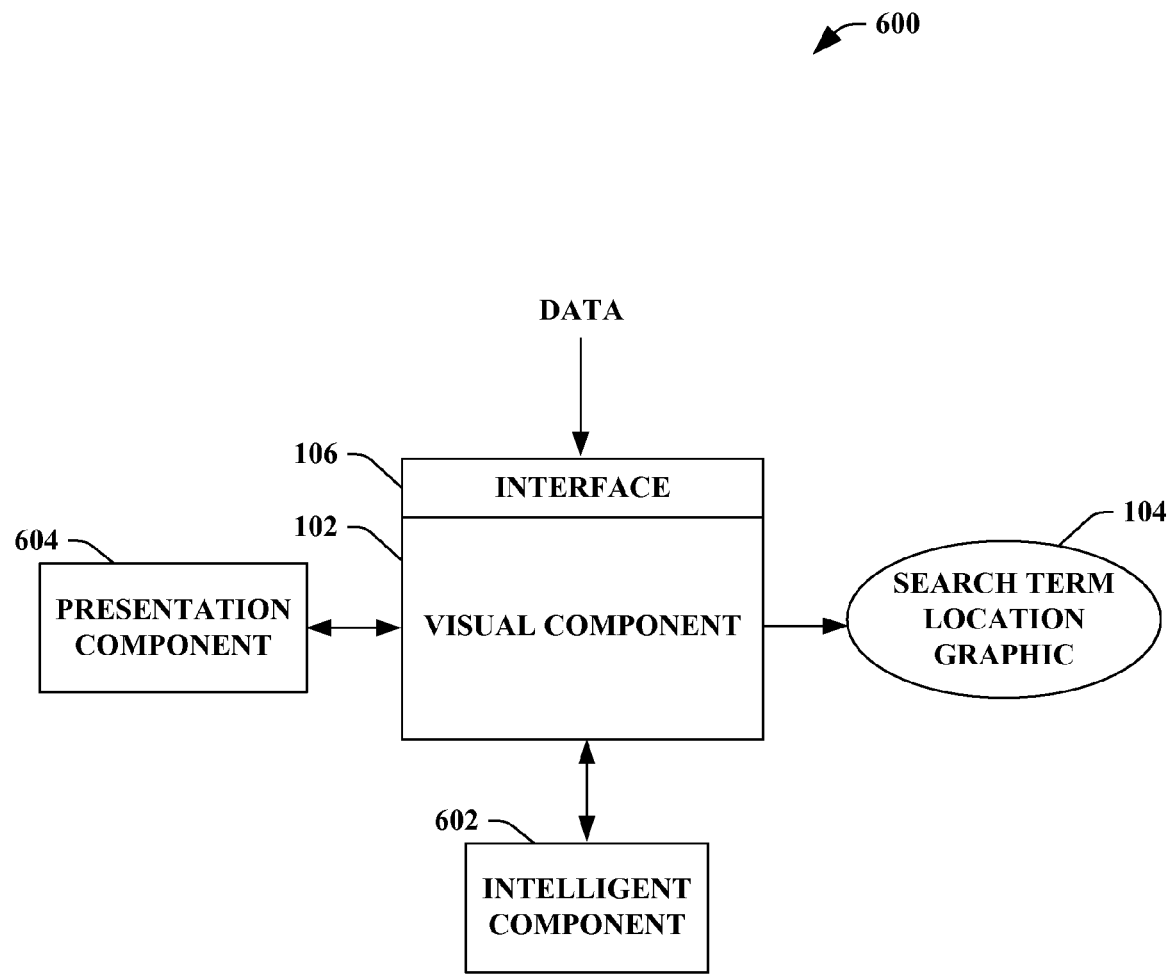
FIG. 6 illustrates a block diagram of an exemplary system that facilitates conveying query results related to data and respective content.

FIG. 6 illustrates a system 600 that employs intelligence to facilitate conveying query results related to data and respective content. The system 600 can include the visual component 102, the interface 106, and the search term location graphic 104, wherein it is to be appreciated that the visual component 102, the search term location graphic 104, and the interface 106 can be substantially similar to respective components, graphics, and interfaces described in previous figures. The system 600 further includes an intelligent component 602. The intelligent component 602 can be utilized by the visual component 102 to facilitate generating the search term location graphic 104 that can identify the location for a query term within searched content/data based. For example, the intelligent component 602 can infer search location graphic, query data, query results, content/data to be searched, user settings, configurations, emphasis settings, color variances, intensity details, search terms, locations associated with terms, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. Moreover, the search term location graphic 104 can present the results of classification algorithms, wherein the classification algorithms are only one way to arrive at that data. The locations of chapters within a book, for instance, might be inferred by a classifier, or they may be indicated by a human being manually supplementing the book scans with some annotations or metadata.

The visual component 102 can further utilize a presentation component 604 that provides various types of user interfaces to facilitate interaction between a user and any component coupled to the visual component 102. As depicted, the presentation component 604 is a separate entity that can be utilized with the visual component 102. However, it is to be appreciated that the presentation component 604 and/or similar view components can be incorporated into the visual component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialog boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the visual component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
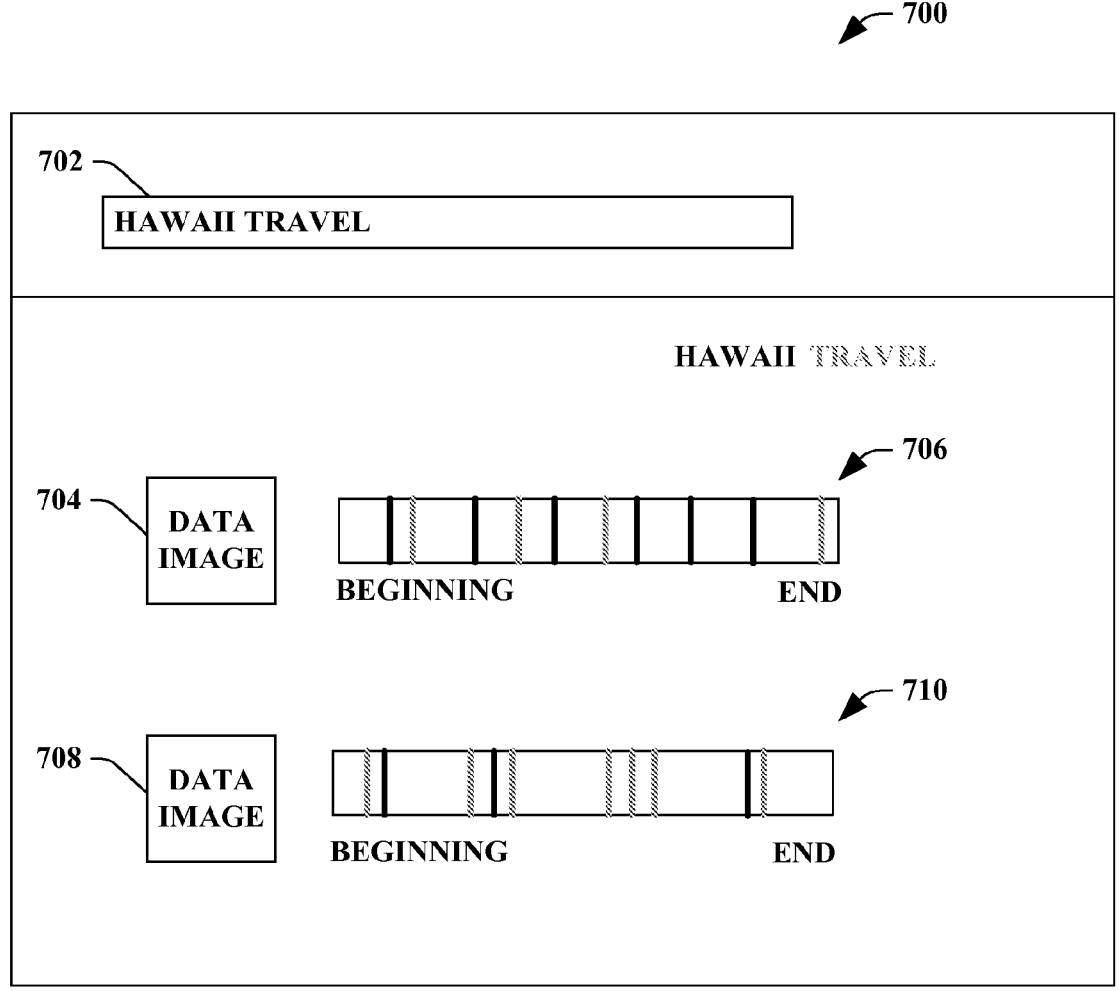
FIG. 7 illustrates a block diagram of an exemplary screen shot depicting various graphics associated with search term location in accordance with the claimed subject matter.

FIG. 7 illustrates a screen shot 700 that depicts various graphics associated with search term location in accordance with the claimed subject matter. The screen shot 700 can include a search and/or query input 703, wherein a user and/or machine can input and/or provide any suitable query term, search term, data query, and the like. In this particular illustration, the query data is "Hawaii travel." Once the search is initiated, various query results can be provided based at least in part upon relevancy and/or amount of data/content queried. Here, for the sake of brevity, two results are depicted. It is to be appreciated that each query result can include a search term location graphic (as described above). For instance, the first query result can each include a data image 704 that can facilitate identifying the result and a search term location graphic 706. The data image can be, but is not limited to, graphic art related to the searched data/content, hyperlinks related to the searched data/content, any suitable identifying image associated with the searched data/content, text, etc. For example, for a book search, a cover page image can be utilized, the textual title, author, publisher of the book, a snippet of matching text, and the like. The search term location graphic 706 can include indications such as vertical lines of varying colors, wherein each color can correspond to a search term. In this example, the term "Hawaii" is indicated by the color black and the term "travel" is indicated by the color gray. The search term location graphic 706 can be oriented in any suitable manner (e.g., horizontal, diagonal, vertical, and the like) and is illustrated in a horizontal manner with the beginning and end of the data/source displayed for ease of conveying locality. The second query result can also include a data image 708 that helps identify the result and a corresponding search term location graphic 710. It is to be appreciated that any number of search results can be provided, wherein each search result can include a related search term location graphic.

Figure 8:
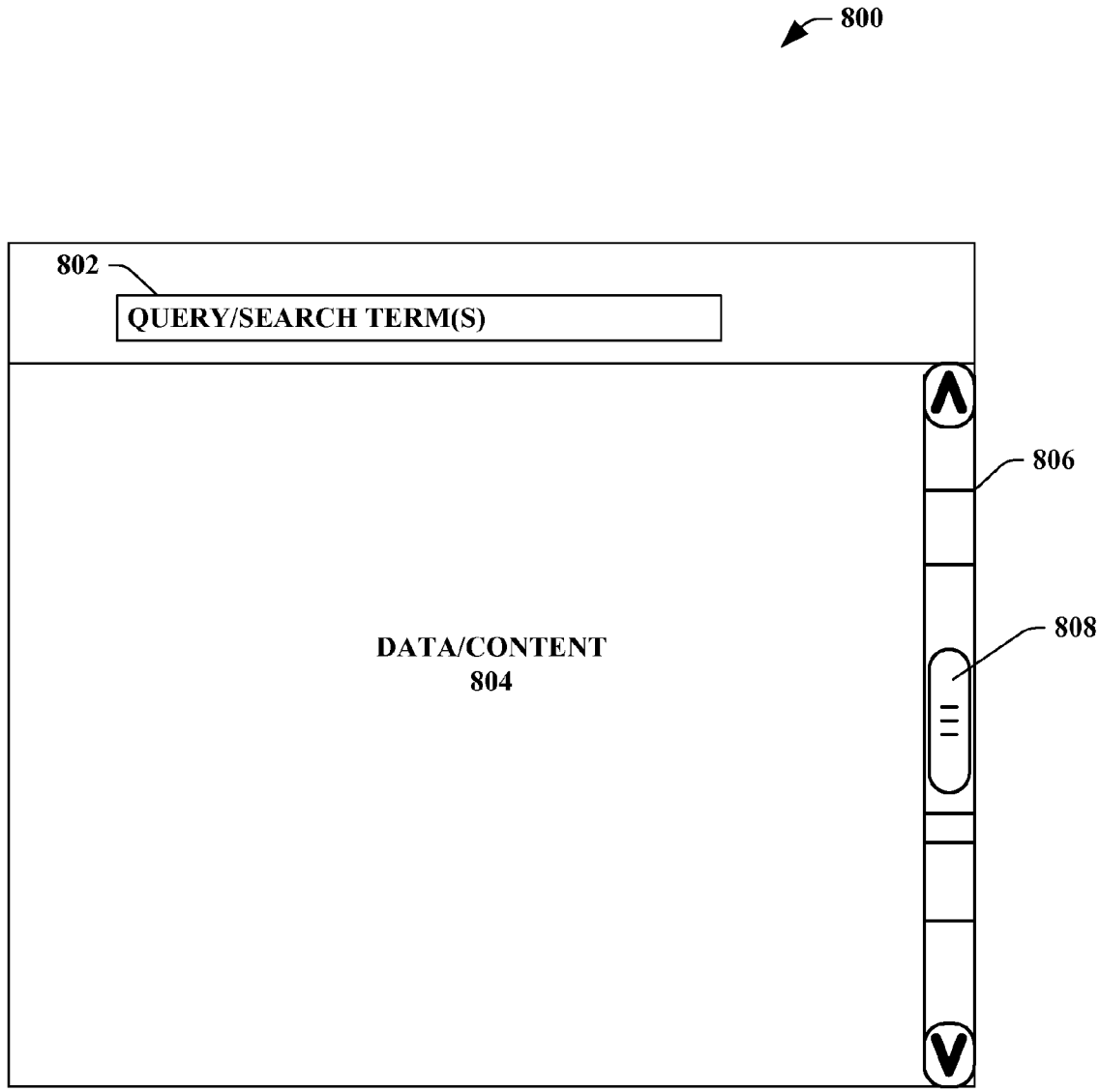
FIG. 8 illustrates a block diagram of an exemplary screen shot depicting various graphics associated with search term location in accordance with the claimed subject matter.

FIG. 8 illustrates a screen shot 800 that depicts various graphics associated with search term location in accordance with the claimed subject matter. The screen shot 800 can include a query input 802 that can receive query data and/or search data which includes at least one query/search term(s). Based at least in part upon the query/search term(s), a search term location graphic can be generated that can be a map, graphic, and/or graph that portrays the location of such term(s) in connection with data/content 804 searched (e.g., one-dimensional electronic files, audio files, video files, web pages, web sites, word processing documents, email, text documents, etc.). As illustrated, the search term location graphic can be an overlay on a scroll-bar and/or a slider associated with the data/content 804. In particular, the search term location graphic can be integrated into the scroll-bar and/or slider typically utilized to navigate the data/content 804.

The integrated search term location graphic can include at least one indication 806 that signals the location of a search term such that a scroll thumb 808 in the gutter of the scroll-bar can be moved to such location. Moreover, it is to be appreciated that the integrated search term location graphic is shown in a vertical position but the integrated search term location graphic can also be employed in the slider and/or scroll-bar in a horizontal manner. In one example, the indications can be of varying colors, fonts, shapes, and the like. For instance, for a first term, a first shape and color can be utilized on the search term location graphic. For a second term, a second shape and color can be utilized on the search term location graphic.

It is to be appreciated that the scroll thumb 808 can be at least partially transparent so as to allow a clear visual of any indications (e.g., such as indication 806) illustrated. In another example, the scroll thumb 808 can be alpha-rendering rather than an opaque rendering. The search term location graphic (e.g., annotation map, search term location map, etc.) can be seen through the scroll thumb 808, while the presence of the scroll thumb 808 is still visible. In yet another example, the scroll thumb 808 can have an emphasized border to further increase its prominence. The alpha-rendering can be used or can be used when the cursor hovers on or near the scroll thumb 808. Moreover, the opaque rendering may not be used when the scroll thumb 808 is not at a minimum thickness (e.g., minimum thickness is employed by a scroll thumb 808 when there are pages of data to display). Moreover, the scroll thumb sizes are usually proportional to the portion of contents visible and only when they are at a minimum size they are not proportional. The minimum thickness scroll thumb 808 can have a distinctive, thin line within the larger scroll thumb 808 to designate a scroll position with respect to the annotation map. The line can be a distinct alpha-rendered color to overcome the imprecision of a larger-than proportional scroll thumb 808 without sacrificing the visibility and target-ability that motivate the larger-than-proportionally-sized scroll thumb 808 for long documents. The thin line may be opted to not be displayed at all times or just when the cursor hovers on or near the scroll thumb 808.

Figure 9:
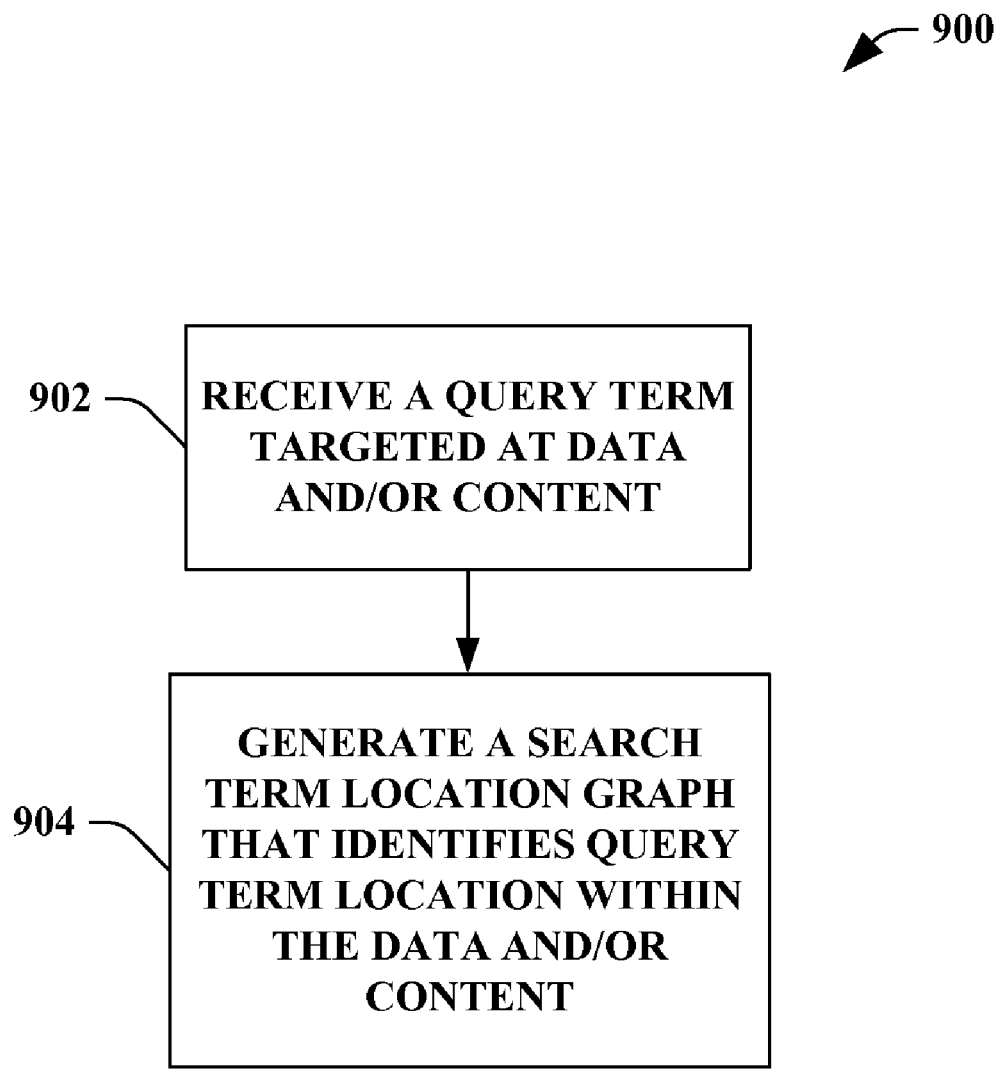
FIG. 9 illustrates an exemplary methodology for conveying query results related to data and respective content.
Figure 10:
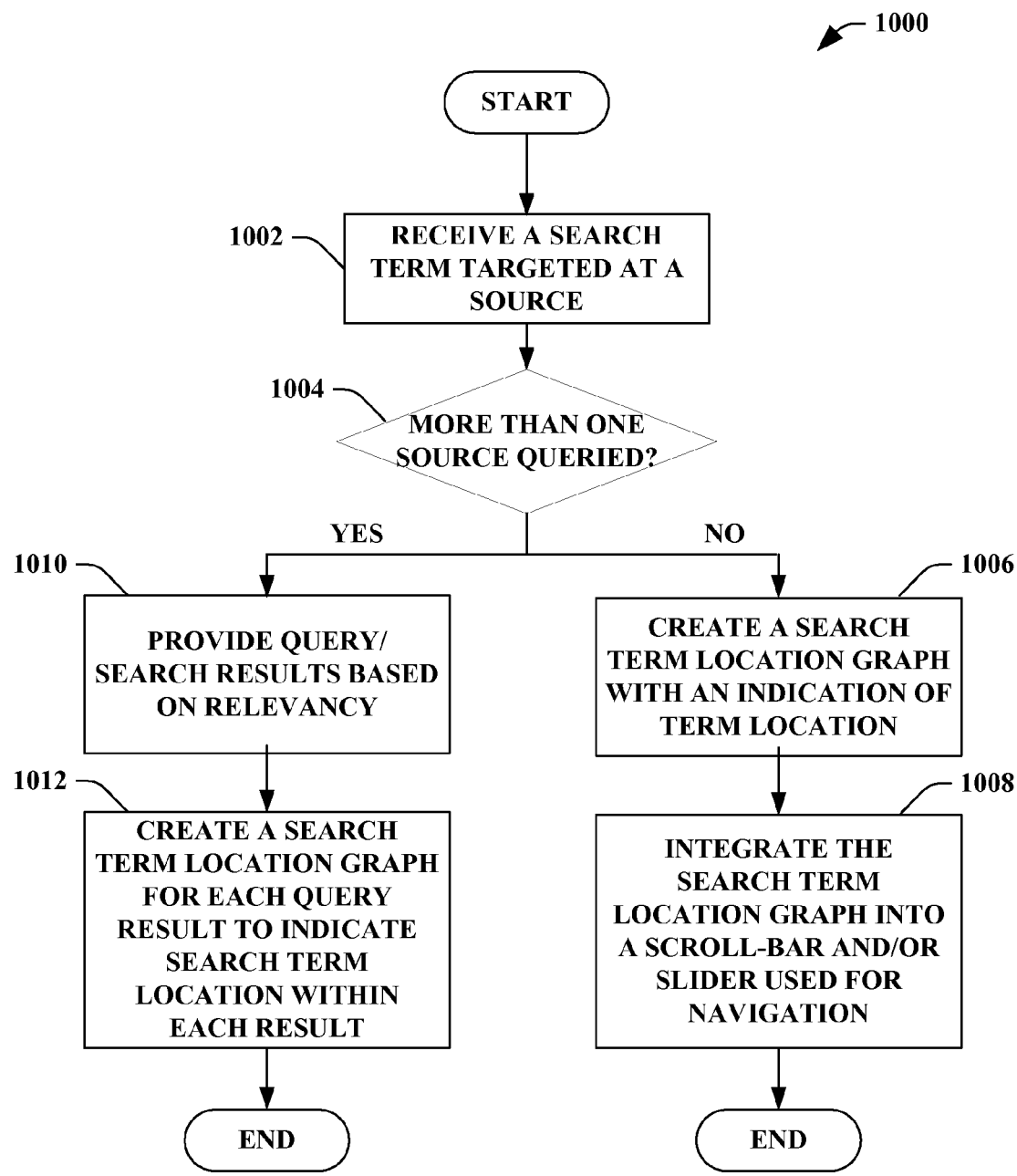
FIG. 10 illustrates an exemplary methodology that facilitates employing a location graphic that identifies a location for at least one search term.

FIGS. 9-10 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 illustrates a methodology 900 for conveying query results related to data and respective content. At reference numeral 902, a query term targeted at data and/or content can be received. The query term can be, for instance, a term, query data, search data, search term, query term, search string, a character, a phrase, etc. Moreover, the data and/or content can be any suitable data that can be queried such as, but is not limited to being, an electronic book, a book, an electronic book file, an electronic magazine, a magazine, an electronic magazine file, an electronic periodical, an electronic periodical file, a periodical, a one-dimensional electronic document, a one-dimensional file, an electronic document, a web page, a web site, an email, an audio file, a video file, data with a slider for navigation, data with a scroll-bar for navigation, an electronic file, a word-processing document, a text document, an audio clip, a video clip, and an instant messenger message, etc.

At reference numeral 904, a search term location graph can be generated that can identify query term location within the data and/or content. The search term location graph can be at least one of a map graphic, a graphic including search term positioning within the searched data/content, a line graph graphic, etc. The search term location graph can illustrate the location and/or locality of particular search terms received in respect to the content and/or data being searched and/or queried in order to provide a global perspective on term location.

For instance, a query term can be "muscle car," wherein three sources can be targeted. Typically, the three sources would be provided based on relevancy calculated with an algorithm. However, the search term location graph can be further provided for each result that plots and/or identifies the location of the search term within each source, wherein the search term location graph can plot the terms from beginning to end on a line graph. In addition, the search term location graph can utilize various techniques to identify term location such as designated colors, fonts, styles, and the like for particular search terms. In another example, the search term location graph can be integrated into a scroll-bar and/or slider that can be utilized for navigation within the data and/or content. The scroll-bar and/or slider can include the search term location graph in a vertical position and/or a horizontal position.

FIG. 10 illustrates a methodology 1000 that facilitates employing a location graphic that identifies a location for at least one search term. At reference numeral 1002, a search term targeted at a source can be received. The search term can be any suitable query related data, wherein the source can be any suitable data and/or content that can be queried. It is to be appreciated that the searched data and/or content can be, but is not limited to being, books, magazines, periodicals, one-dimensional electronic documents, electronic documents, web pages, web sites, email, audio, video, any suitable data with a slider for navigation, any suitable data with a scroll-bar for navigation, electronic files, word-processing documents, text documents, magazine files, audio clips, video clips, instant messenger messages, etc.

At reference numeral 1004, a determination is made whether one or more source is queried. For example, if querying a plurality of data sources, the methodology 1000 can continue to reference numeral 1010. In another example, if the querying is within a single source, the methodology 1000 can continue to reference numeral 1006. If there is not more than one source queried, the methodology proceeds to reference numeral 1006. At reference numeral 1006, a search term location graph can be created with an indication of term location. The search term location graph can be substantially similar to a map that can provide the location of search terms within the source. It is to be appreciated that the search term location graph can include any suitable display to indicate location and/or a global perspective of positioning within the source. At reference numeral 1008, the search term location graph can be integrated into a scroll-bar and/or slider used for navigation within the source. For instance, the search term location graph can be incorporated into a horizontal and/or vertical scroll-bar and/or slider. The indications of search term positions can be embedded into a gutter related to a scroll-thumb to allow the user to have an idea of search term locality.

If there is more than one source queried, the methodology 1000 continues at reference numeral 1010. At reference numeral 1010, query/search results are provided based at least in part upon relevancy. For instance, such query/search results can be provided by a search engine and/or search system algorithm. Yet, such results still can be difficult to decipher and/or determine relevance without more guidance and/or assistance. Thus, at reference numeral 1012, a search term location graph can be created for each query result to indicate search term location within each result. For example, the search term location graph can be substantially similar to a line graph plotting the occurrences of the search term from a beginning of the search result (e.g., data/content searched) to the end, wherein the graph can plot multiple search terms with designated characteristics (e.g., font, color, size, shape, etc.).

Figure 11:
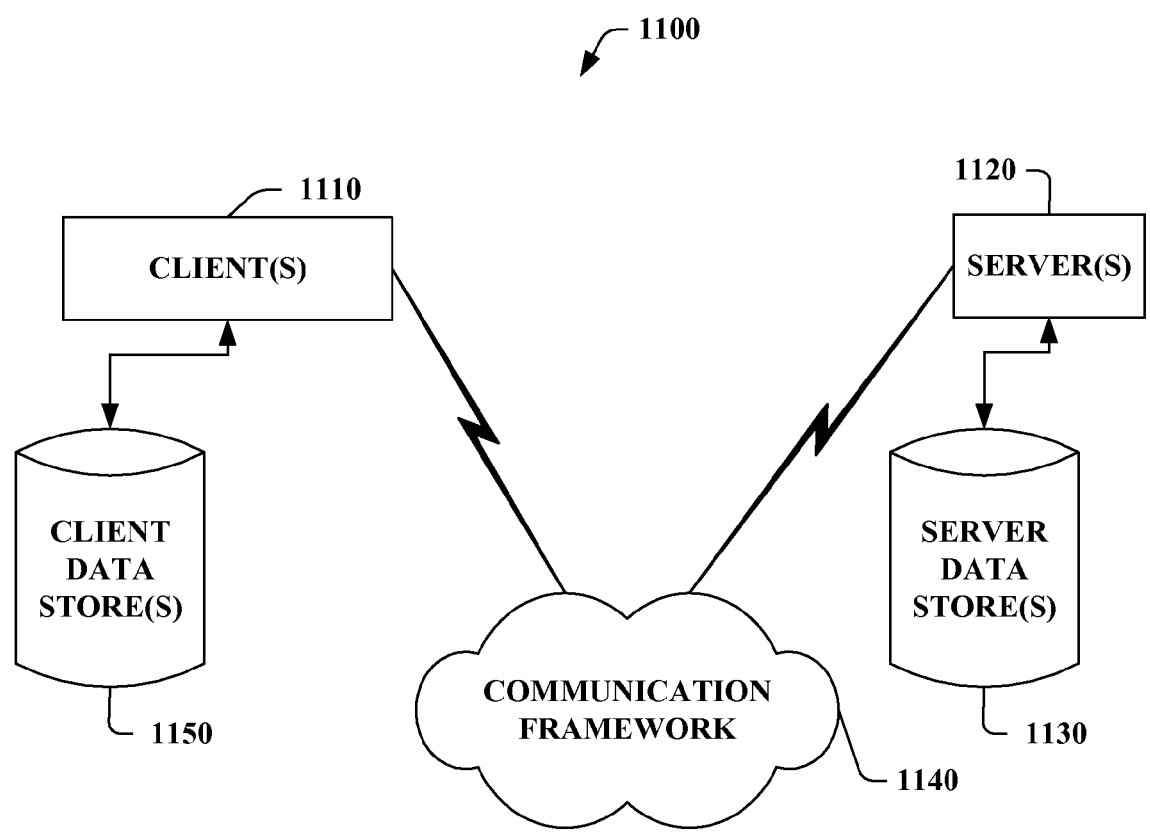
FIG. 11 illustrates an exemplary networking environment, wherein the novel aspects of the claimed subject matter can be employed.
Figure 12:
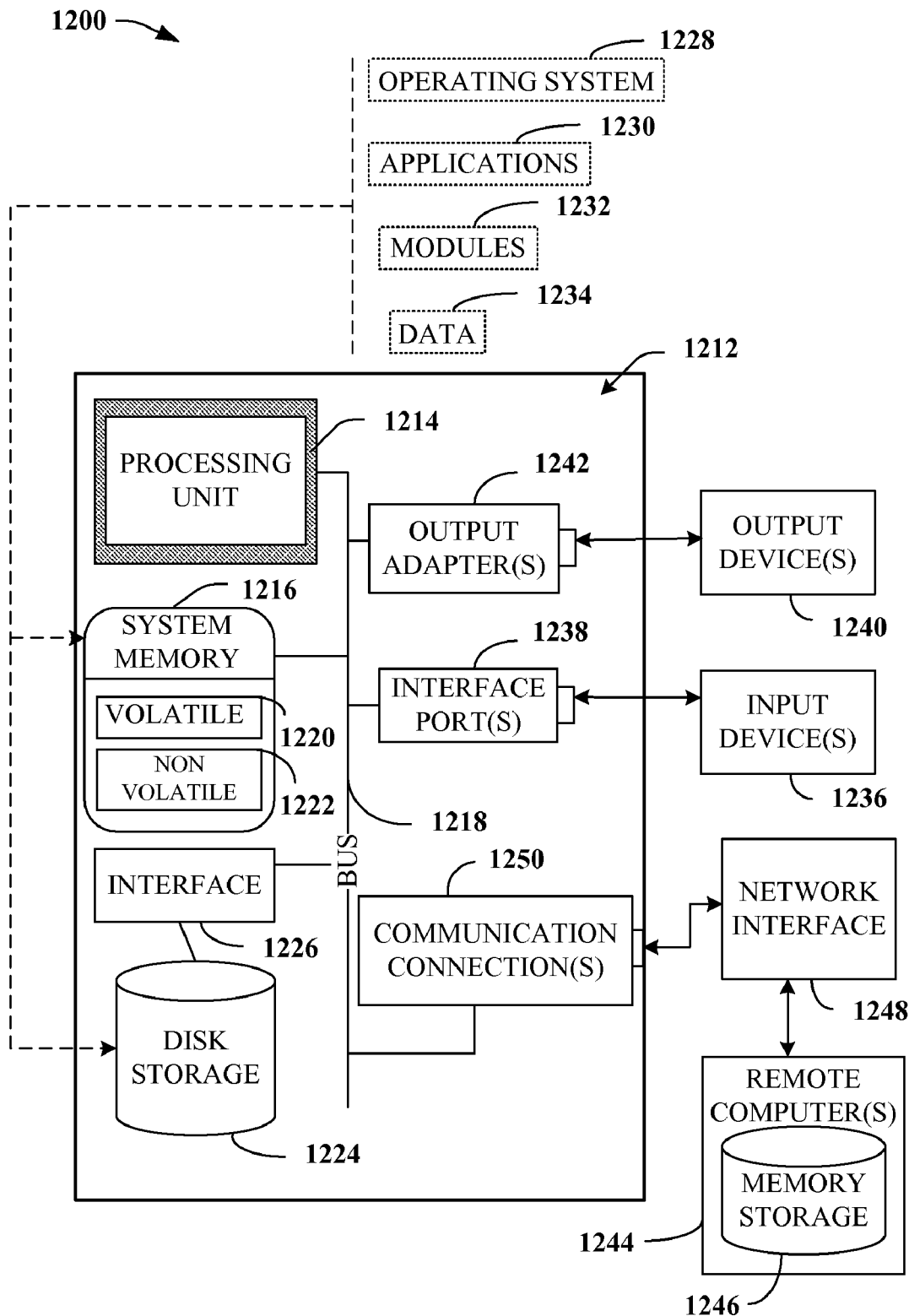
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a visual component that facilitates employing a graphic to identify a location associated with a search term within search content/data, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1140 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates conveying enhanced query results, comprising:
   a processor that executes the following computer-executable components stored on a computer-storage medium:
   an interface component that:
     receives a query corresponding to data, and
     transcribes at least one of an audio or video data item to locate one or more search terms of the query within the data item when the queried data comprises at least one of the audio or video data item; and
   a visual component that transmits instructions to display a query result based at least in part upon the query, wherein the query result identifies one or more data items and includes a search term location graphic for each of the one or more data items,
   wherein the search term location graphic identifies a location within the data item of an occurrence of at least one search term of the query,
   wherein when the query result identifies a single data item, the query result is displayed together with the search term location graphic, wherein the search term location graphic is integrated into a vertical scroll-bar having a partially transparent scroll thumb, and
   wherein when the query result identifies a plurality of data items, at least two of the plurality of data items are displayed together with the corresponding search term location graphics, wherein each search term location graphic is displayed between the edges of one of a scroll-bar or slider.

2. The system of claim 1, wherein the one or more data items comprises one or more of an electronic book, a book, an electronic book file, an electronic magazine, a magazine, an electronic magazine file, an electronic periodical, an electronic periodical file, a periodical, a one-dimensional electronic document, a one-dimensional file, an electronic document, a web page, a web site, an email, an audio file, a video file, data with a slider for navigation, data with a scroll-bar for navigation, an electronic file, a word-processing document, a text document, an audio clip, a video clip, or an instant messenger message.

3. The system of claim 1, further comprising a data rank graph component that creates at least one search term location graphic as a line graph map with at least one plot of at least one search term occurrence within the corresponding data item, wherein the plot is indicated by at least one of a hash, a line, a shape, a color, a font, a vertical line, a horizontal line, a dot, a circle, a star, an arrow, a square, a rectangle, a triangle, or a graphic that indicates a location on the line graph map.

4. The system of claim 1, wherein at least one search term location graphic identifies a location associated with at least one item distributed throughout the corresponding data item, and wherein the item is at least one of a graphic, a picture, a number, a header, a footer, a signature, a digital signature, a watermark, metadata, a document property, a format, a file size, an ink annotation, a voice annotation, a comment bubble, or an image.

5. The system of claim 1, wherein at least one search term location graphic utilizes color variance associated with a frequency of search term occurrence, and wherein a dark color correlates a high frequency of the search term occurrence and a light color correlates to a low frequency of the search term occurrence.

6. The system of claim 1, further comprising a scroll-bar component that incorporates at least one search term location graphic into at least one of a slider, a scroll-bar, or a tool utilized to navigate queried data in at least one direction.

7. The system of claim 6, wherein at least one of the slider, the scrollbar, or the tool are positioned in at least one of a horizontal or vertical orientation.

8. The system of claim 6, wherein the search term location graphic incorporated by the scroll-bar component is embedded within a central area of at least one of the slider or scroll-bar.

9. The system of claim 8, wherein when the query result identifies a plurality of data items, each search term location graphic includes a scroll thumb that is at least one of the following: a scroll thumb that is at least partially transparent; a scroll thumb that is alpha-rendering; a scroll thumb that includes an emphasized border; a scroll thumb that utilizes alpha-rendering upon a cursor within proximity; or a scroll thumb that has a minimum thickness with a distinct thin boundary within a larger scroll thumb to designate a scroll position with respect to the search term location graphic.

10. The system of claim 1, further comprising an emphasis component that enhances at least one search term location graphic to accentuate the location of the search term within the corresponding data item, wherein the accentuation is based at least in part upon a color, a font, a size, a bold, an italicize, an underline, a strikethrough, a highlight, a vertical line, a horizontal line, a dot, a circle, a star, a color, an arrow, a square, a rectangle, a triangle, a shape, a graphic that indicates a location on the graph, or a color variance.

11. The system of claim 1, further comprising a navigation component that allows navigation to a position within a data item identified by the query result based at least in part upon a selection of a correlating position on the search term location graphic that corresponds to the data item.

12. The system of claim 1, further comprising a hover component that displays a portion of a data item identified by the query result to be displayed upon at least one of a mouse and a cursor placement over a location on the search term location graphic that corresponds to the identified data item.

13. The system of claim 1, wherein at least one search term location graphic includes at least one indication respective to a search term, wherein the search term location graphic illustrates the location of the search term within the corresponding data item from a beginning of the corresponding data item to an end of the corresponding data item.

14. A computer-implemented method that facilitates providing a query result with context, comprising:

employing a processor to execute computer-executable instructions stored on a computer-readable medium to perform the following acts:

receiving one or more query search terms targeted toward data;

when the data comprises at least one data item including audio or video formatting, transcribing the audio or video formatting to locate the one or more search terms of the query in the data item;

providing a query result identifying one or more data items;

generating a search term location graph for each of the one or more data items, the search term location graph identifying locations within the data item of occurrences of the one or more search terms; and transmitting instructions to display the query result, including the identified one or more data items and corresponding search term location graphs, when the query result identifies a single data item, transmitting instructions to display the query result together with the search term location graph, wherein the search term location graph is integrated into a vertical scroll-bar having a partially transparent scroll thumb; and when the query result identifies a plurality of data items, transmitting instructions to display at least two of the plurality of data items together with the corresponding search term location graphs, wherein each search term location graph is displayed between the edges of one of a scroll-bar or slider.

15. The method of claim 14, wherein the one or more data items comprises one or more of an electronic book, a book, an electronic book file, an electronic magazine, a magazine, an electronic magazine file, an electronic periodical, an electronic periodical file, a periodical, a one-dimensional electronic document, a one-dimensional file, an electronic document, a web page, a web site, an email, an audio file, a video file, data with a slider for navigation, data with a scroll-bar for navigation, an electronic file, a word-processing document, a text document, an audio clip, a video clip, or an instant messenger message.

16. The method of claim 14, wherein the vertical scroll bar and the scroll-bar or slider between the edges of which the query result identifying a plurality of data items is displayed are partially transparent to enable display of locations of search terms in the data items through the vertical scroll-bar or the scroll-bar or slider.

17. The method of claim 14, further comprising creating the search term location graph as a line graph map with at least one plot of at least one search term occurrence within the plurality of data items identified in the query result.

18. The method of claim 14, wherein integrating into the vertical scroll-bar comprises embedding the search term location graph between sides of the scroll-bar.

19. One or more computer storage media having computer-executable instructions embodied thereon for performing a method for providing an enhanced query result, the method comprising:

receiving a query related to data, the query including one or more search terms;

when the data comprises at least one data item including audio or video formatting, transcribing the audio or video formatting to locate the one or more search terms of the query in the data item;

providing a query result based at least in part upon the query, the query result identifying one or more data items;

generating a search term location graphic for each of the one or more data items, the search term location graphic identifying locations within the data item of occurrences of the one or more search terms;

when the query result identifies a single data item, transmitting instructions to display the query result together with the search term location graphic, wherein the search term location graphic is integrated into a vertical scroll bar having a partially transparent scroll thumb; and when the query result identifies a plurality of data items, transmitting instructions to display at least two of the plurality of data items together with the corresponding search term location graphics, wherein each search term location graphic is displayed between the edges of one of a scroll bar or slider.

* * * * *